United States Patent
Suzuki et al.

(10) Patent No.: US 11,186,440 B2
(45) Date of Patent: Nov. 30, 2021

(54) PARTS ACCUMULATOR

(71) Applicant: NTN CORPORATION, Osaka (JP)

(72) Inventors: Shouya Suzuki, Shizuoka (JP); Shinji Fushihara, Shizuoka (JP); Takakazu Kitagawa, Shizuoka (JP); Akinori Ootsuka, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 16/970,261

(22) PCT Filed: Feb. 26, 2019

(86) PCT No.: PCT/JP2019/007202
§ 371 (c)(1),
(2) Date: Aug. 14, 2020

(87) PCT Pub. No.: WO2019/167917
PCT Pub. Date: Sep. 6, 2019

(65) Prior Publication Data
US 2021/0107742 A1    Apr. 15, 2021

(30) Foreign Application Priority Data
Feb. 27, 2018  (JP) .............................. JP2018-033019

(51) Int. Cl.
*B65G 27/02*    (2006.01)
*B65G 27/16*    (2006.01)
*B65G 47/14*    (2006.01)

(52) U.S. Cl.
CPC ............. *B65G 27/02* (2013.01); *B65G 27/16* (2013.01); *B65G 47/1421* (2013.01)

(58) Field of Classification Search
None
See application file for complete search history.

(56) References Cited

U.S. PATENT DOCUMENTS 4,021,902 A  *  5/1977  Roland .................. B65G 27/02
                                                 29/786
4,821,782 A  *  4/1989  Hyer ....................... B65B 37/00
                                                 141/255
(Continued)

FOREIGN PATENT DOCUMENTS

JP        49-85776       11/1947
JP        50-143282       5/1949
(Continued)

OTHER PUBLICATIONS

International Search Report dated May 14, 2019 in International (PCT) Application No. PCT/JP2019/007202.
(Continued)

*Primary Examiner* — Kavel Singh
(74) *Attorney, Agent, or Firm* — Wenderoth, Lind & Ponack, L.L.P.

(57) ABSTRACT

A parts accumulating section includes a cylindrical center member; and a hose helically wrapped around the outer periphery of the cylindrical center member, and connecting two predetermined steps of a parts production line to each other. The hose has an inner diameter dimension which enables parts to pass, in a predetermined attitude, through the hose with only a respective one of the parts disposed in the hose in the radial direction of the hose. A vibration generating section applies torsional vibrations to the parts accumulating section so that the parts are fed through the hose. The parts discharged from the upstream step are accumulated in the hose in the same order as they are handled in the upstream step. The parts are fed through the hose without generating surface damage to the parts due to their collision against each other, and are supplied to the downstream step.

18 Claims, 6 Drawing Sheets

(56) References Cited

U.S. PATENT DOCUMENTS

| | | | | |
|---|---|---|---|---|
| 5,143,253 | A * | 9/1992 | Takahashi | B65G 51/03 |
| | | | | 221/197 |
| 6,364,088 | B1 * | 4/2002 | Steffens | B65G 11/063 |
| | | | | 193/12 |
| 6,669,435 | B2 * | 12/2003 | Bertsch | B65G 47/06 |
| | | | | 406/38 |
| 6,932,210 | B2 * | 8/2005 | Kramer | A61J 3/10 |
| | | | | 198/493 |
| 2014/0251763 | A1 | 9/2014 | Mitzkat | |

FOREIGN PATENT DOCUMENTS

| | | |
|---|---|---|
| JP | 59-143808 | 8/1984 |
| JP | 2-258123 | 10/1990 |
| JP | 2-132019 | 11/1990 |
| JP | 2009-113961 | 5/2009 |
| JP | 2015-501771 | 1/2015 |

OTHER PUBLICATIONS

International Preliminary Report on Patentability dated Aug. 27, 2020 in International (PCT) Application No. PCT/JP2019/007202.

* cited by examiner

PARTS ACCUMULATOR

TECHNICAL FIELD

The present invention relates to a parts accumulator installed between predetermined two steps of a parts production line to accumulate parts discharged from the upstream one of the two steps, and supply the parts to the downstream step.

BACKGROUND ART

In a parts production line for producing relatively small parts such as rollers for rolling bearings, a vibratory bowl feeder (also known as a "parts feeder") is sometimes installed between two consecutive steps of the production line as a parts accumulator which temporarily accumulates parts discharged from the upstream step, and then automatically supplies the parts to the downstream step.

General vibratory bowl feeders are basically constituted by a bowl having a helical feed path formed in the inner peripheral wall thereof; an upper vibrated member to which the bowl is attached; a base disposed under the upper vibrated member; a plurality of inclined leaf springs equidistantly spaced apart from each other in the circumferential direction of the bowl, and coupling the upper vibrated member and the base to each other; and a vibrating mechanism disposed between the upper vibrated member and the base. By torsional vibrations applied to the bowl from the vibrating mechanism via the upper vibrated member, parts accumulated on the bottom of the bowl are fed along the helical feed path of the bowl, and are supplied from an upper portion of the bowl to the downstream step.

Also, a vibratory bowl feeder is known in which a friction material layer is disposed on the surface of the feed path of the bowl to increase the friction coefficient between the feed path surface and the parts being fed, thereby improving the parts feeding capability of the bowl feeder and ensuring its capability to supply parts to the downstream step (see, e.g., Japanese Unexamined Utility Model Application Publication No. H2-132019).

While such a vibratory bowl feeder has a sufficient parts supplying capability, if the upstream and downstream steps are machining steps, as described below, the quality of the parts may deteriorate depending on, e.g., the machining method of the downstream step.

First described will be when a through-feed machining method is used in the step downstream of the vibratory bowl feeder. As through-feed type of machining devices, there are, e.g., a centerless grinding machine as shown in FIG. 6, and a superfinishing machine as shown in FIGS. 7A and 7B.

The centerless grinding machine of FIG. 6 includes a cylindrical grinder 51 and a regulating wheel 52 disposed in juxtaposition with each other with their center axes slightly inclined relative to each other such that when the grinder 51 and the regulating wheel 52 are rotated in the same direction, with the grinder 51 pressed against the outer peripheries of outer rings A for rolling bearings which are continuously fed into the space between the grinder 51 and the regulating wheel 52, it is possible to grind the outer diameters of the outer rings A while feeding the outer rings A in the axial direction by supporting them with a blade 53.

The superfinishing machine of FIGS. 7A and 7B includes a pair of feed rolls 54 and 55 disposed in the same positional relationship as the grinder 51 and the regulating wheel 52 of FIG. 6. Thus, by rotating the feed rolls 54 and 55 in the same direction with needle rollers B continuously fed into the space between the feed rollers 54 and 55, the needle rollers B are fed in the axial direction. With the needle rollers B being fed in the axial direction, a plate-shaped grinder 56 is pressed against the outer peripheral surfaces of the needle rollers B and oscillated in the feed direction of the needle rollers B, thereby superfinishing the radially outer surfaces of the needle rollers B. The grinder 56 is attached to the bottom end of a rod 57a of an air cylinder 57 while being vertically movably supported by a grinder holder 58 such that the grinder 56 is moved vertically by actuating the air cylinder 57, and is oscillated in unison with the air cylinder 57 and the grinder holder 58.

Such a through-feed type of machining device is capable of simultaneously machining a plurality of workpieces by pressing its grinder against the continuously fed workpieces, and thus is very high in productivity.

On the other hand, in general machining facilities, due to the heat generated from the facilities per se (heat generated by machining, or heat generated from their constituent members such as a motor and a spindle), ambient temperature, coolant temperature, etc., constituent parts of the machining facilities are expanded or contracted. Thus, the positional relationship between a machining tool such as a grinder and the workpieces tends to change (this phenomenon is called "temperature drift"), so that the dimensions of the workpieces gradually change with the progression of machining time.

In a vibratory bowl feeder, parts discharged from the upstream step are accumulated on the bottom of the bowl at random (i.e., irrespective of the order in which the parts are machined in the upstream step), and then are supplied, one by one, to the downstream step, so that in the downstream step, the parts are machined in an order different from the order in which they are machined in the upstream step.

Therefore, if a through-feed type of machining device is connected to the downstream side of a vibratory bowl feeder, since variations in dimensional errors are large among the parts (workpieces) before being simultaneously machined by the machining device in the downstream step, variations in the surface pressures between the grinder of the machining device and the parts are also large. This may reduce the machining accuracy to such an extent that the dimensions and surface properties of some of the machined parts may fall out of the acceptable range.

Another problem with a vibratory bowl feeder is that while parts are being fed, some of the parts may fall from the feed path onto the bottom of the bowl due to vibration or by being ejected due to improper attitude, and collide against parts accumulated on the bottom of the bowl. This may result in the formation of, e.g., dents on both the falling parts and accumulated parts, thus adversely affecting the outer appearance of these parts as completed products.

SUMMARY OF THE INVENTION

It is an object of the present invention to provide a parts accumulator capable of accumulating parts discharged from an upstream production step in the same order as they are processed in the upstream step, feeding the thus-accumulated parts without causing damage to the surfaces of the parts, and supplying them to the downstream step.

In order to achieve the above object, the present invention provides a parts accumulator installed between two predetermined steps of a parts production line, the two predetermined steps comprising an upstream step and a downstream step. The parts accumulator is configured to accumulate parts discharged from the upstream step, and supply the parts to the downstream step. The parts accumulator comprises: a parts accumulating section including a cylindrical center member, and at least one hose having a first end portion connected to a parts discharge port of the upstream step, and a second end portion connected to a parts supply port of the downstream step, the hose being helically disposed on one of an outer periphery and an inner periphery of the cylindrical center member. A vibration generating section is configured to apply torsional vibrations around a center axis of the cylindrical center member to the parts accumulating section. The hose has an inner diameter dimension which enables the parts to pass, in a predetermined attitude, through the hose with only each respective one of the parts disposed in the hose in a radial direction of the hose. The parts accumulator is configured such that the parts discharged from the parts discharge port of the upstream step enter, one by one and in a predetermined attitude, the first end portion of the hose; are fed through the hose by the torsional vibrations applied to the parts accumulating section; and are supplied, in a same order as the parts enter the hose, from the second end portion of the hose to the parts supply port of the downstream step.

As described above, the parts accumulating section includes a cylindrical center member, and at least one hose helically disposed on one of the outer and inner peripheries of the cylindrical center member, and connecting two predetermined steps of a parts production line to each other. The hose has an inner diameter dimension which enables parts discharged from the upstream step to pass, in a predetermined attitude, through the hose with only each one of the parts disposed in the hose in the radial direction of the hose; and torsional vibrations are to be applied to the parts accumulating section so that the parts are fed in the hose. Therefore, the parts discharged from the upstream step can be accumulated in the hose in the same order as they are processed in the upstream step; be fed without causing damage to the surfaces of the parts due to collision against each other; and be supplied to the downstream step.

The hose may be detachably disposed on the one of the outer periphery and the inner periphery of the cylindrical center member. With this arrangement, to accumulate and feed parts different in size and kind, it is only necessary to replace the hose with a different hose having an inner diameter corresponding to the different parts, and thus it is possible to efficiently deal with various parts.

If a lubricating liquid is to be supplied into the hose together with the parts, since the lubricating liquid is present between each part and each of the front and rear parts located right before and after the part, it is possible to more reliably prevent damage to the surfaces of the parts.

If the vibration generating section is configured to be capable of selectively reversing a torsional direction of the torsional vibrations applied to the parts accumulating section, it is possible to selectively feed the parts in the ascending direction or in the descending direction, and thus to more freely lay out the parts accumulator and the upstream and downstream steps.

The vibration generating section may comprise: an upper vibrated member to which the cylindrical center member is attached; a base disposed under the upper vibrated member; a plurality of resilient members disposed at predetermined intervals in a circumferential direction of the cylindrical center member, and coupling the upper vibrated member and the base to each other; and a vibrating mechanism disposed between the upper vibrated member and the base, and configured to generate horizontal vibrations.

If the predetermined two steps comprise steps of machining parts, respectively, the present invention can be especially effectively applied.

In the parts accumulator of the present invention, as described above, the parts accumulating section includes a cylindrical center member, and at least one hose helically disposed on one of the outer and inner peripheries of the cylindrical center member, and having an inner diameter dimension which enables the parts to pass, in a predetermined attitude, through the hose with only each one of the parts disposed in the hose in the radial direction of the hose; and torsional vibrations are to be applied to the parts accumulating section so that the parts are fed in the hose. Therefore, the parts discharged from the upstream step can be accumulated and fed in the same order as they are processed in the upstream step; and can be supplied to the downstream step.

Therefore, in a parts production line in which the parts accumulator of the present invention is installed, and in which the upstream and downstream steps of the parts accumulator are machining steps, even if the dimensions of the machined parts gradually change in the upstream step with the progression of machining, e.g., due to the temperature drift of the machining facility, since the parts can be machined in the downstream step in the same order as they are machined in the upstream step, the variations of in dimensional errors produced in the upstream step do not affect the machining accuracy of the downstream step to a large degree, thus making it possible to improve the dimensional accuracy of the parts upon completion of machining.

Also, for the parts accumulator of the present invention, since parts are accumulated in the hose and fed through the hose, it is possible to prevent surface damage to the parts due to collision against each other, and thus to improve the surface quality of the parts as completed products.

DETAILED DESCRIPTION OF THE INVENTION

Figure 1:
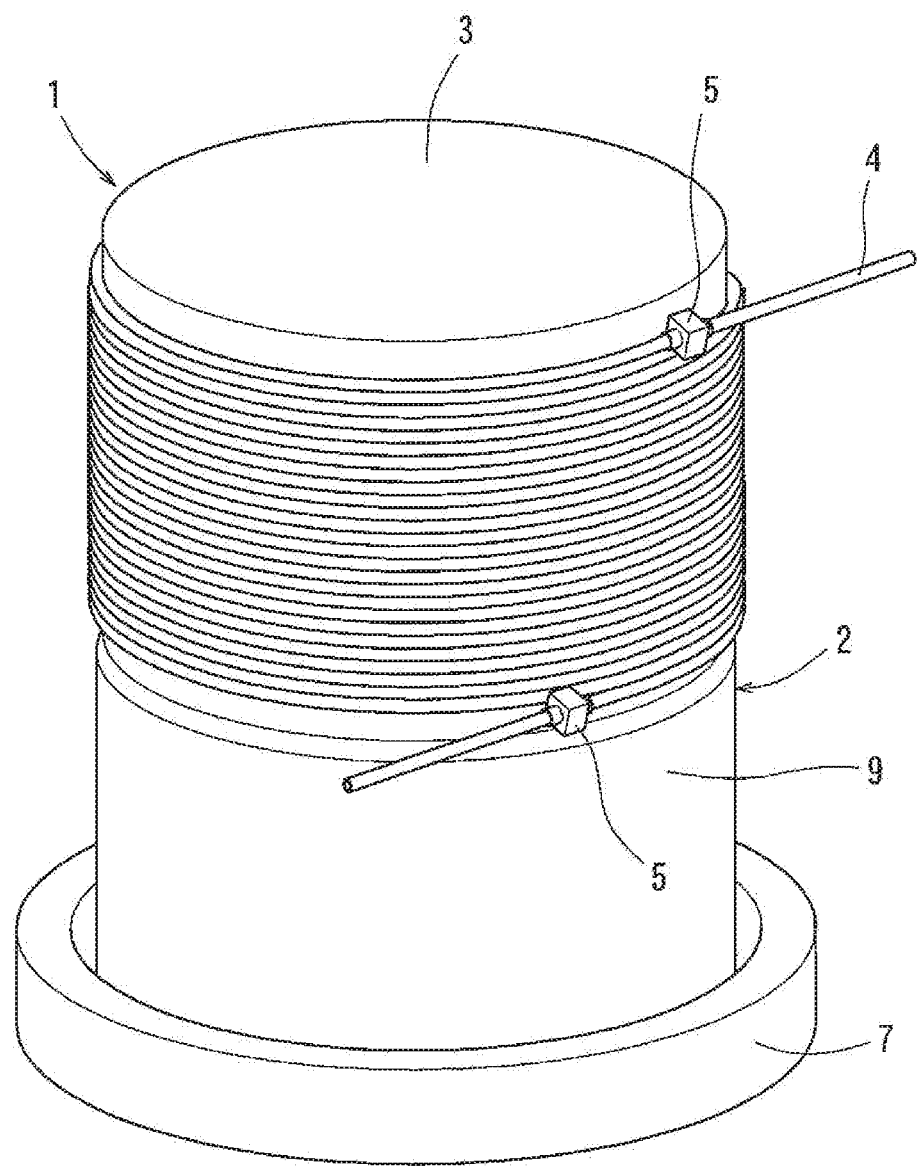
FIG. 1 is a perspective view of a parts accumulator embodying the present invention, the perspective view illustrating the outer appearance of the parts accumulator.
Figure 2:
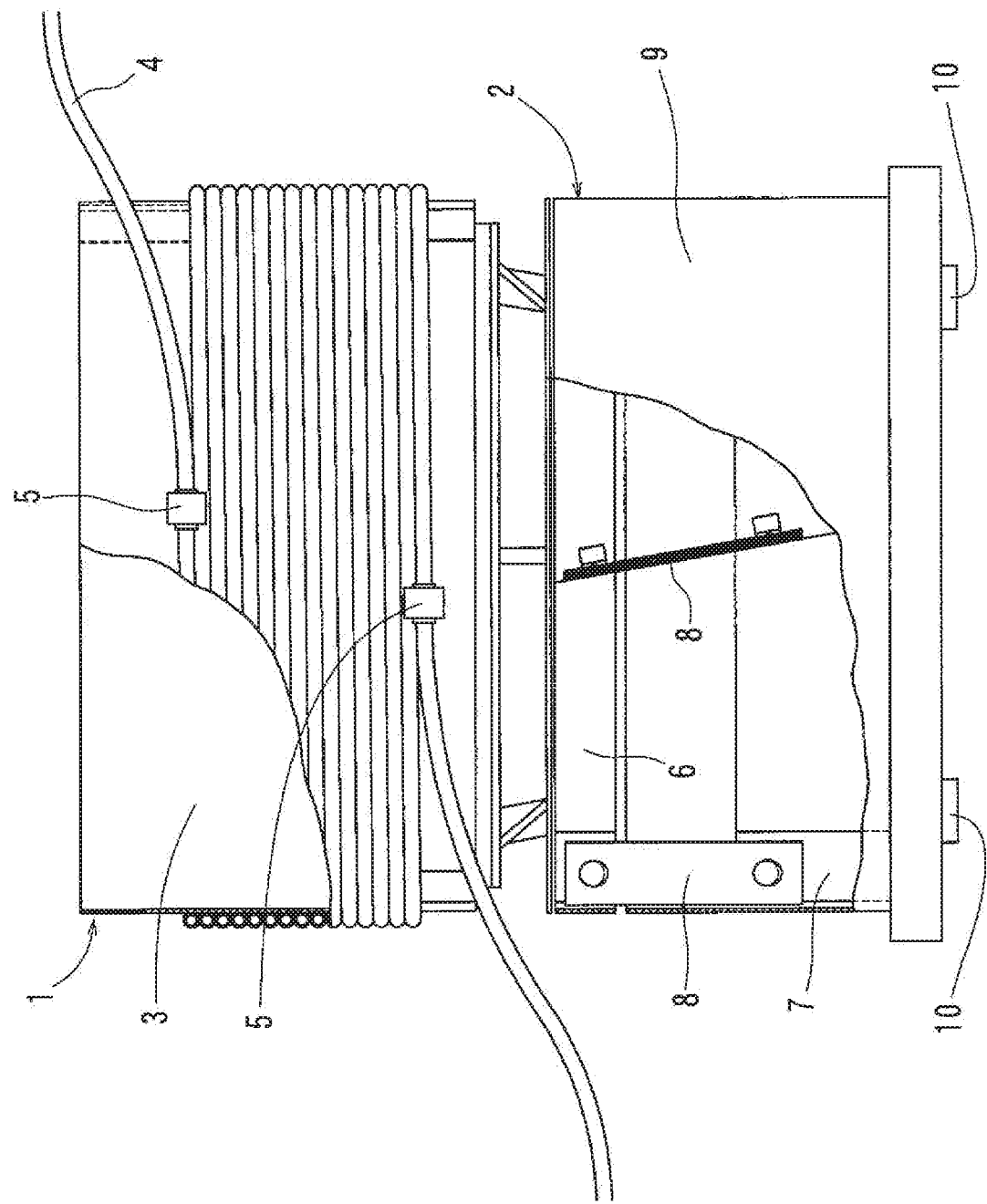
FIG. 2 is a front view of the parts accumulator of FIG. 1 while partially cut out.
Figure 3:
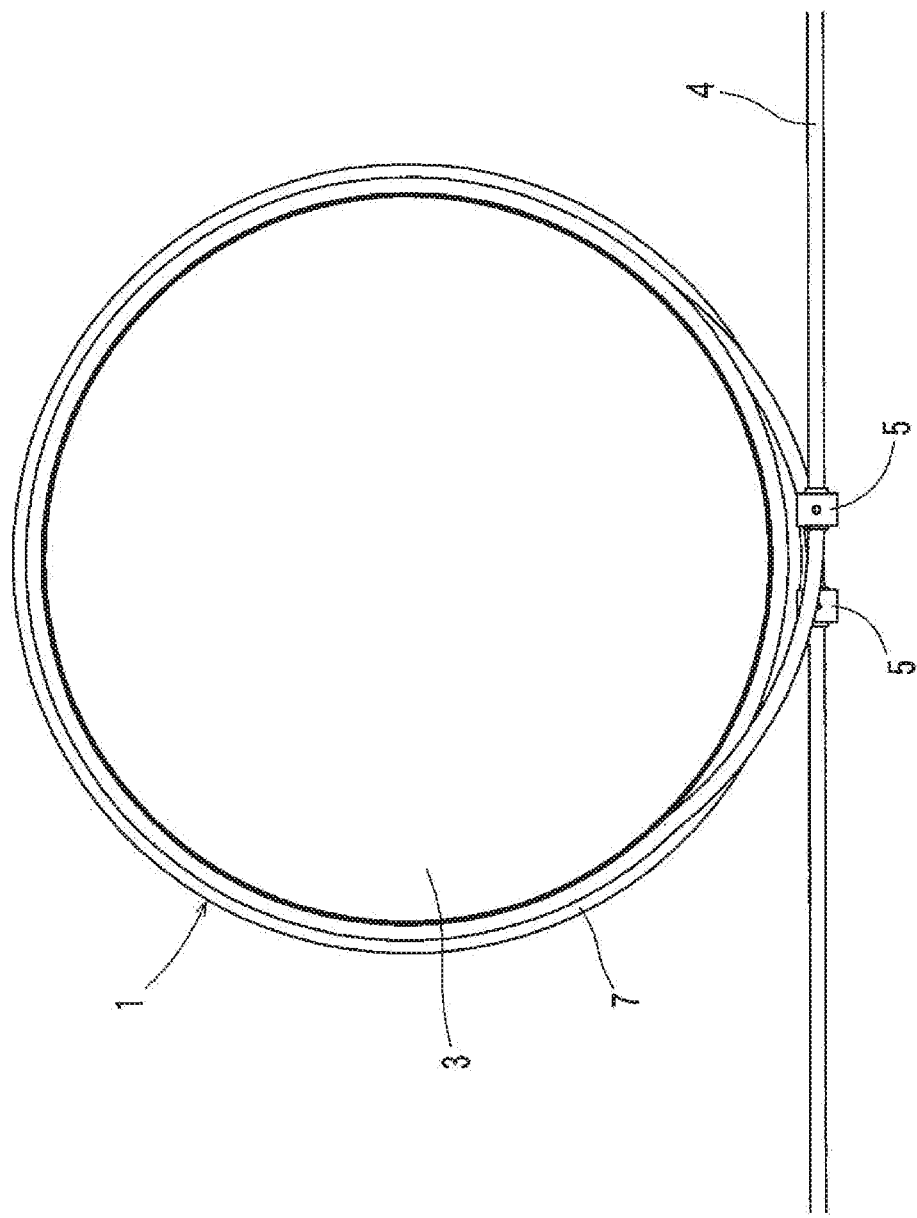
FIG. 3 is a plan view of the parts accumulator of FIG. 1.
Figure 4:
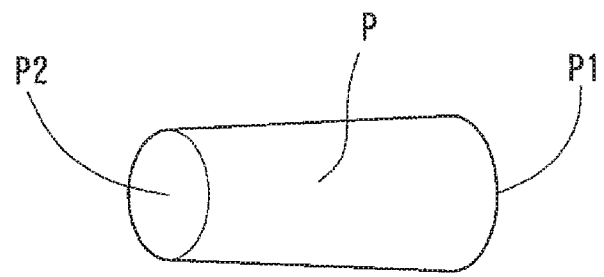
FIG. 4 is a perspective view exemplifying parts to be accumulated and conveyed.

A parts accumulator embodying the present invention is now described with reference to FIGS. 1 to 5. The parts accumulator is installed between two predetermined steps of a parts production line. As illustrated in FIGS. 1 to 3, the parts accumulator comprises a parts accumulating section 1, and a vibration generating section 2 connected to a bottom surface of the parts accumulating section 1. The parts accumulator is used to accumulate and feed tubular parts P having, as illustrated in FIG. 4, an axial end P1 larger in diameter than the other axial end P2 thereof, specifically, tapered rollers to be incorporated into tapered roller bearings. Though not shown, of the above two steps, the upstream step is a step in which the outer peripheral surfaces of the tubular parts P are roughly ground, while the downstream step is a step in which the outer peripheral surfaces of the tubular parts P are ground and finished by through-feed machining.

As illustrated in FIGS. 1 to 3, the parts accumulating section 1 comprises a cylindrical center member 3, and a hose 4 made of a resin and helically wrapped around (disposed on) the outer peripheral surface of the center member 3 to form a single-layer helical coil on the center member 3 in which each wrap of the helical coil contacts the outer surface of the center member and contacts each of the adjacent wrap(s) located directly above and below. The hose 4 includes a first end portion which separates from the outer periphery of the center member 3 at its upper end portion and which is connected to a parts discharge port (not shown) of the upstream step. The hose 4 further includes a second end portion which separates from the outer periphery of the center member 3 at is lower end portion and which is connected to a parts supply port (not shown) of the downstream step. Thus, the parts P are fed in the hose 4 in the descending direction. The hose 4 is fixed to the center member 3 by hose fixing members 5 at locations in the vicinity of the points where the hose 4 separates from the outer periphery of the center member 3 at its upper and lower end portions. The hose 4 can thus be easily detached from the center member 3 by removing the hose fixing members 5.

Figure 5:
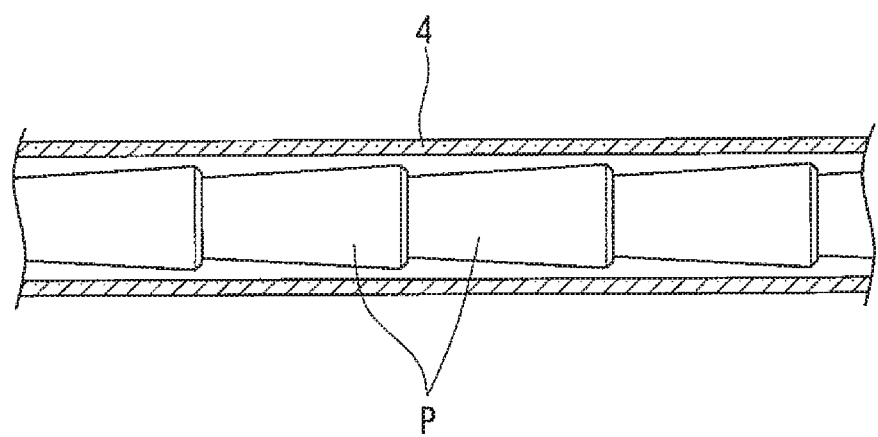
FIG. 5 is a sectional view illustrating how parts are in the hose of FIG. 1.
Figure 6:
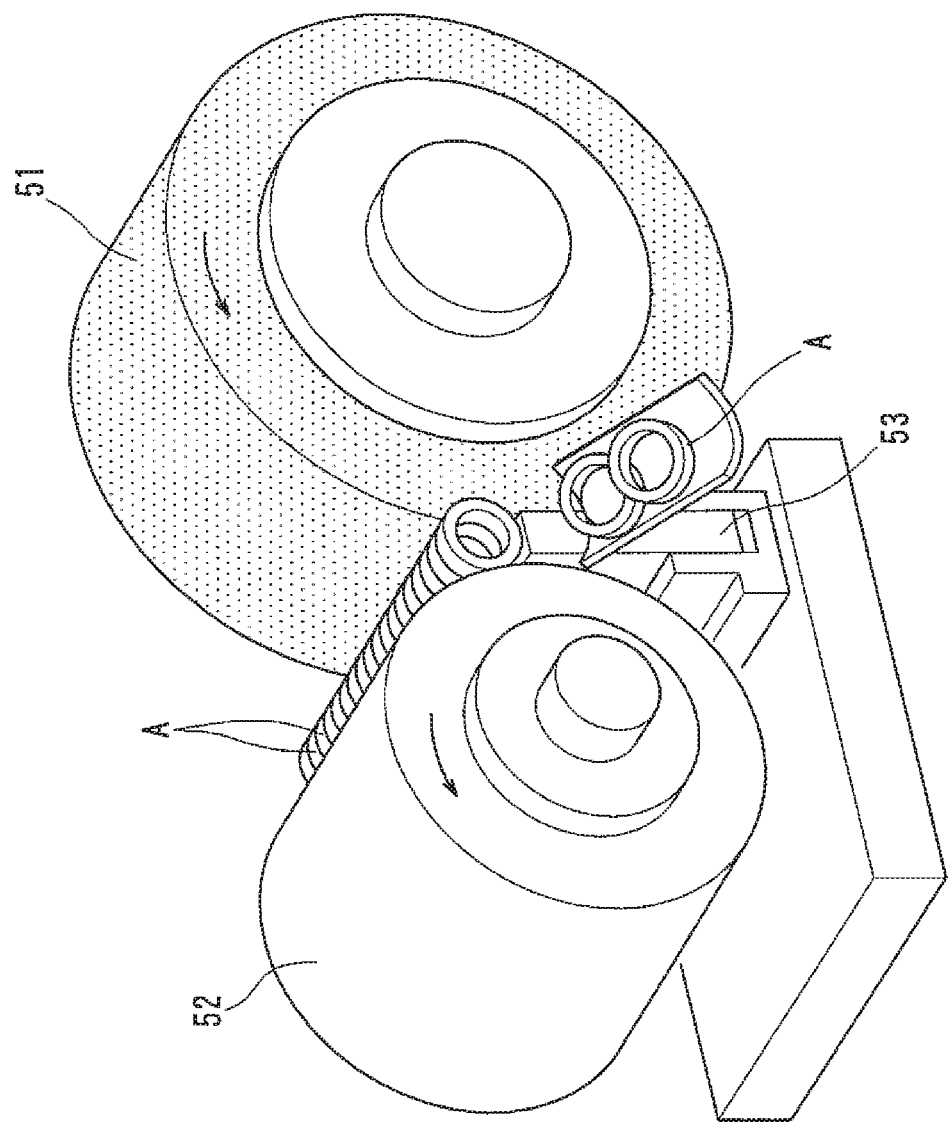
FIG. 6 is a perspective view exemplifying a through-feed type of machining device.
Figure 7A:
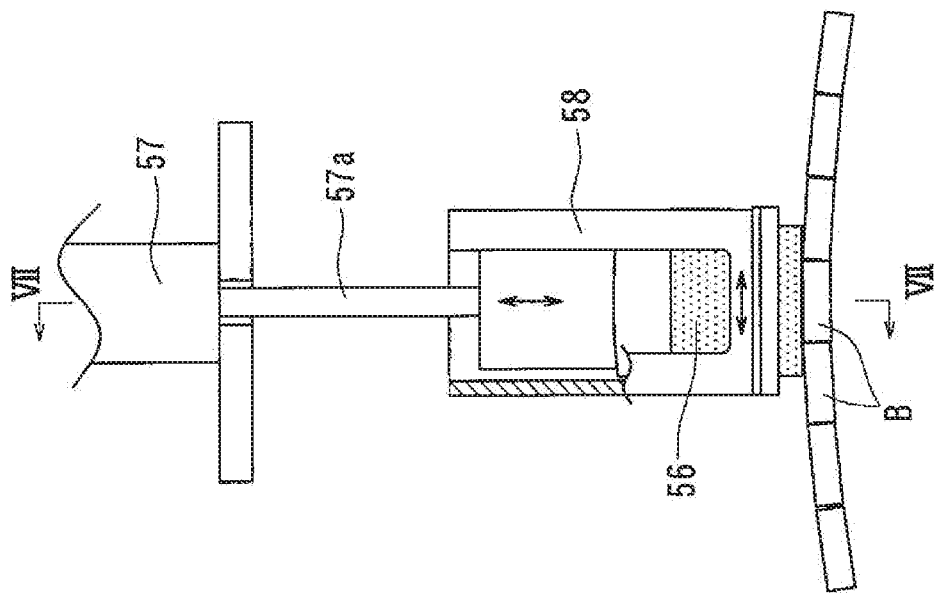
FIG. 7A is a front view exemplifying a different through-feed type of machining device while partially cut out.
Figure 7B:
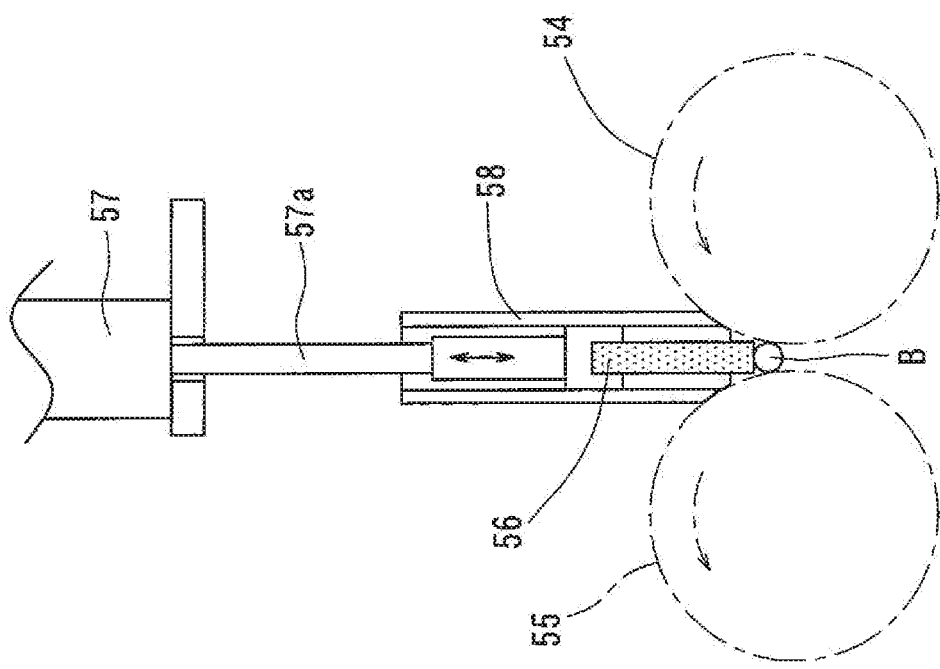
FIG. 7B is a sectional view taken along line VII-VII of FIG. 7A.

As illustrated in FIG. 5, the hose 4 has an inner diameter dimension which enables the parts P to pass, in a predetermined attitude (in the shown example, with the axial direction of the parts P orthogonal to the radial direction of the hose 4), through the hose 4 with only each one of the parts P disposed in the hose 4 in the radial direction of the hose 4. To accumulate and feed parts different in size and/or kind, it is necessary to use a hose having a different inner diameter. However, since the hose 4 is detachably wrapped around the outer periphery of the center member 3 as described above, when feeding parts different in size and/or kind, it is required only to replace the existing hose with a new one having an inner diameter suitable for the above different parts, and such replacement can be done easily.

Though not shown, a lubricating liquid such as cleaning oil or grinding coolant is supplied into the hose 4 together with the parts P to reduce damage to the surface of each part P in the hose 4 due to contact with the parts P in front and rear thereof and with the hose 4.

The vibration generating section 2 is, as illustrated in FIGS. 1 and 2, a vibratory bowl feeder of an ordinary structure with the bowl removed, and includes a disk-shaped upper vibrated member 6 to which the center member 3 of the parts accumulating section 1 is attached; a base 7 disposed under the upper vibrated member 6; and, as resilient members, a plurality of leaf springs 8 disposed at predetermined intervals in the circumferential direction of the center member 3, and coupling the upper vibrated member 6 and the base 7 to each other. The leaf springs 8 are attached to the upper vibrated member 6 and the base 7 while being inclined relative to the respective vertical planes at the same angle. A cylindrical cover 9 is attached to the outer periphery of the upper vibrated member 6 so as to cover the leaf springs 8. The base 7 is supported by anti-vibration members 10, such as anti-vibration rubbers, fixed on the floor.

While not shown, a vibrating mechanism configured to generate horizontal vibrations is disposed between the upper vibrated member 6 and the base 7. The vibrating mechanism comprises an AC electromagnet attached to the base 7, and a movable iron core attached to the upper vibrated member 6, and is configured to vibrate the upper vibrated member 6 due to intermittent electromagnetic attraction forces acting between the electromagnet and the movable iron core. Thus, the vibration generating device 2 applies, to the parts accumulating section 1, torsional vibrations around the center axis of the center member 3 from the upper vibrated member 6, so that the parts P are fed through the interior of the hose 4 which is helically wrapped around the outer periphery of the center member 3.

The vibration generating section 2 is configured such that, by simply changing, e.g., the arrangement of its vibrating mechanism, the torsional direction of the torsional vibrations applied to the parts accumulating section 1 can be reversed. Thus, while, in the embodiment, parts P are fed in the descending direction, the parts accumulator can be reconfigured to feed parts P in the ascending direction. Since the parts feed direction is selectable, it is possible to more freely lay out not only the parts accumulator but also the upstream and downstream steps.

It is now described how the parts accumulator operates. The parts P discharged from the parts discharge port of the upstream step enter, one by one and in a predetermined attitude, the first end portion of the hose 4; are fed through the interior of the hose 4 by the torsional vibrations applied to the parts accumulating section 1; and are supplied from the second end portion of the hose 4 to the parts supply port of the downstream step in the same order as they enter the hose 4. In other words, the parts P discharged from the upstream step can be accumulated and fed in the parts accumulator, and supplied to the downstream step in the same order as they are machined in the upstream step.

Therefore, even if the outer diameter dimensions of the parts P gradually change with the progression of machining by the rough grinding facility in the upstream step, e.g., due to temperature drift of the rough grinding facility, since the through-feed type of grinding machine in the downstream step can grind and finish the parts P in the same order as they are machined in the upstream step, variations in dimensional errors are small among the parts P to be simultaneously ground by the through-feed type of grinding machine, and thus the grinder of the grinding machine can be pressed against these parts P with substantially the same surface pressure. Thus, by using the parts accumulator of the present invention, compared to using a conventional vibratory bowl feeder, the grinding accuracy in the downstream step is less affected by variations in outer diameter dimensional errors produced during machining in the upstream step, so that upon completion of grinding in the downstream step, the parts P show improved outer diameter dimensional accuracy.

One problem with conventional vibratory bowl feeders is that while parts are being fed in the feed path, some of them may fall from the feed path onto the bottom of the bowl, and collide against parts accumulated on the bottom of the bowl, resulting in, e.g., the formation of dents on both the falling parts and accumulated parts. In contrast thereto, since the parts accumulator of the present invention is configured such that parts P are accumulated in and fed through the hose 4, there is no risk of surface damage to the parts P due to collision. Also, since, as described above, a lubricating liquid is supplied into the hose 4 together with the parts P so as to prevent the parts P from coming into contact with each other, it is also possible to improve the surface quality of the parts P upon completion of grinding.

Also, since the parts accumulator of the present invention is configured to supply all of the parts P received from the upstream step to the downstream step without returning any of them to the upstream step while being fed through the parts accumulator, the parts accumulator has a parts feeding capability equal to or higher than those of conventional vibratory bowl feeders.

Also, since the parts accumulator of the present invention is identical in overall structure to a general vibratory bowl feeder except that the bowl is replaced by the parts accumulating section 1, it is possible to easily manufacture the parts accumulator by modifying a commercially available vibratory bowl feeder. Another advantage of the parts accumulator of the present invention is that if a hose is used in an existing parts production line to feed parts P between its two predetermined steps, by simply connecting the hose 4 of the parts accumulating section 1 to an intermediate portion of the hose between these two steps, the parts accumulator can be used to accumulate and feed the parts P.

The above-described embodiment is a mere example in every respect, and the present invention is not limited thereto. The scope of the present invention is indicated not by the above description but by the claims, and should be understood to include all modifications within the scope and the meaning equivalent to the scope of the claims.

For example, while the parts accumulating section of the embodiment has the hose thereof helically wrapped around the outer periphery of the cylindrical center member, the hose may be helically wrapped around the inner periphery of the center member, or two hoses may be used which are helically wrapped around the outer and inner peripheries of the center member, respectively.

Also, while lubricating fluid is preferably supplied into the hose of the parts accumulating section as in the embodiment, if surface damage to the ends of each part P in the parts feed direction due to contact with the front and rear parts P is not a big problem, lubricating fluid may not be supplied into the hose, thereby simplifying the structure of the parts accumulator.

Also, while a hose made of resin is used in the embodiment, a hollow member made of a material other than resin, e.g., a pipe made of metal, may be used instead.

While, in the embodiment, a part of a general vibratory bowl feeder is used as the vibration generating section, the structure of the vibration generating section is not limited thereto, provided that the vibration generating section is capable of applying torsional vibrations to the parts accumulating section.

The present invention is not only applicable to a parts accumulator as described in the embodiment which is configured to accumulate and feed tapered rollers, but also widely and effectively applicable to a parts accumulator installed, as in the embodiment, between the downstream through-feed machining step and the upstream step of a parts production line, and configured to accumulate and feed parts such as various rollers for rolling bearings to subject these parts to machining in the downstream through-feed machining step.

Also, the parts accumulator of the present invention can be not only installed between predetermined two steps of a parts production line, but also used for inspection, transportation, injection, etc.

DESCRIPTION OF REFERENCE NUMERALS

1: Parts accumulating section
2: Vibration generating section
3: Center member
4: Hose
5: Hose fixing member
6: Upper vibrated member
7: Base
8: Leaf spring
9: Cover
10: Anti-vibration member
P: Part (tapered roller)

The invention claimed is:

1. A parts accumulator to be installed between two predetermined steps of a parts production line, the two predetermined steps comprising an upstream step and a downstream step, the parts accumulator being configured to accumulate parts discharged from the upstream step, and to supply the parts to the downstream step, the parts accumulator comprising:
   a parts accumulating section including a cylindrical center member, and at least one hose having a first end portion connected to a parts discharge port of the upstream step, and a second end portion connected to a parts supply port of the downstream step, the hose being helically disposed on one of an outer peripheral surface and an inner peripheral surface of the cylindrical center member so as to form a single-layer helical coil, each wrap of the single-layer helical coil contacting the one of the outer peripheral surface and the inner peripheral surface of the cylindrical center member and contacting an adjacent upper and lower wrap of the single-layer helical coil; and
   a vibration generating section configured to apply torsional vibrations around a center axis of the cylindrical center member to the parts accumulating section,
   wherein the hose has an inner diameter dimension which enables the parts to pass, in a predetermined attitude, through the hose with only a respective one of the parts disposed in the hose in a radial direction of the hose, and
   wherein the parts accumulator is configured such that:
      the parts discharged from the parts discharge port of the upstream step enter, one by one and in a predetermined attitude, the first end portion of the hose;
      the parts are fed through the hose by the torsional vibrations applied to the parts accumulating section; and
      the parts are supplied, in a same order as the parts enter the hose, from the second end portion of the hose to the parts supply port of the downstream step.

2. The parts accumulator according to claim 1, wherein the hose is detachably disposed on the one of the outer periphery and the inner periphery of the cylindrical center member.

3. The parts accumulator according to claim 1, wherein a lubricating liquid is to be supplied into the hose together with the parts.

4. The parts accumulator according to claim 1, wherein the vibration generating section is configured to selectively reverse a torsional direction of the torsional vibrations applied to the parts accumulating section.

5. The parts accumulator according to claim 1, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and a vibrating mechanism disposed between the upper vibrated member and the base, the vibrating mechanism being configured to generate horizontal vibrations.

6. The parts accumulator according to claim 1, wherein the predetermined two steps comprise steps of machining parts, respectively.

7. The parts accumulator according to claim 2, wherein a lubricating liquid is to be supplied into the hose together with the parts.

8. The parts accumulator according to claim 2, wherein the vibration generating section is configured to selectively reverse a torsional direction of the torsional vibrations applied to the parts accumulating section.

9. The parts accumulator according to claim 2, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

10. The parts accumulator according to claim 3, wherein the vibration generating section is configured to selectively reverse a torsional direction of the torsional vibrations applied to the parts accumulating section.

11. The parts accumulator according to claim 3, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

12. The parts accumulator according to claim 4, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

13. The parts accumulator according to claim 7, wherein the vibration generating section is configured to selectively reverse a torsional direction of the torsional vibrations applied to the parts accumulating section.

14. The parts accumulator according to claim 7, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

15. The parts accumulator according to claim 8, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

16. The parts accumulator according to claim 10, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

17. The parts accumulator according to claim 13, wherein the vibration generating section comprises:
   an upper vibrated member to which the cylindrical center member is attached;
   a base disposed under the upper vibrated member;
   a plurality of resilient members disposed at predetermined intervals in a circumferential direction of the cylindrical center member, and coupling the upper vibrated member and the base to each other; and
   a vibrating mechanism disposed between the upper vibrated member and the base, the vibrating mechanism being configured to generate horizontal vibrations.

18. The parts accumulator according to claim 1, wherein the hose is a first hose helically disposed on the outer peripheral surface of the cylindrical center member so as to form a single-layer outer helical coil, the parts accumulator further comprising a second hose helically disposed on the inner peripheral surface of the cylindrical center member so as to form a single-layer inner helical coil, each wrap of the single-layer inner helical coil contacting the inner peripheral surface of the cylindrical center member and contacting an adjacent upper and lower wrap of the single-layer inner helical coil.

* * * * *